May 27, 1958

A. W. EDWARDS ET AL 2,836,768

RECLOSING CIRCUIT BREAKERS

Filed Sept. 4, 1953

INVENTORS
Andrew W. Edwards &
William G. Meyer
BY
Ralph H. Swingle
ATTORNEY

May 27, 1958

A. W. EDWARDS ET AL 2,836,768

RECLOSING CIRCUIT BREAKERS

Filed Sept. 4, 1953

WITNESSES:

INVENTOR
Andrew W. Edwards &
William G. Meyer
BY
ATTORNEY

May 27, 1958   A. W. EDWARDS ET AL   2,836,768
RECLOSING CIRCUIT BREAKERS
Filed Sept. 4, 1953   4 Sheets-Sheet 4

WITNESSES:
E. A. McCloskey
F. V. Giolma

INVENTOR
Andrew W. Edwards &
William G. Meyer
BY
Ralph H. Swingle
ATTORNEY

United States Patent Office 2,836,768
Patented May 27, 1958

2,836,768

RECLOSING CIRCUIT BREAKERS

Andrew W. Edwards, East McKeesport, Pa., and William G. Meyer, Portland, Oreg., assignors to Westinghouse Electric Corporation, East Pittsburgh, Pa., a corporation of Pennsylvania Application September 4, 1953, Serial No. 378,586

4 Claims. (Cl. 317—18)

Our invention relates generally to circuit interrupters, and it has reference in particular to circuit interrupting apparatus for providing ground protection of single-phase ungrounded, or three-phase delta circuits.

Because such systems do not usually have a permanent ground, line-to-ground faults do not generally result in heavy fault currents such as would cause opening of the usual recloser. Detection of such faults therefore poses a problem, and elaborate relaying schemes have heretofore been used in an effort to overcome this difficulty. Because reclosers are usually operated in response to the phase current in the line they are not generally sensitive to line-to-ground faults on such systems.

It is therefore generally an object of our invention to provide in a simple and effective manner for protecting ungrounded single-phase or three-phase delta circuits from ground faults.

More specifically it is an object of our invention to provide for using the unbalance of voltages in an ungrounded single-phase or three-phase delta circuit to effect interruption of the circuit in the event of a ground on the circuit.

Another object of our invention is to provide in an ungrounded single-phase circuit for using one pole of a three-phase recloser in conjunction with a voltage divider circuit for opening the other two poles to interrupt the single-phase circuit in the event of a ground thereon.

Yet another object of our invention is to provide in an ungrounded single-phase circuit for using a three-pole recloser with two poles connected to interrupt the circuit and the third pole connected in a ground fault circuit for effecting lockout of the other two poles in the event of a continuing ground fault.

It is an important object of our invention to provide in a three-pole recloser for having two poles with arc-pressure type interrupting units for maximum current interruption and the third pole with an open-type interrupter for more positive response on low-current ground faults.

Other objects will in part be obvious, and will, in part, be explained hereinafter.

In practicing our invention in one of its forms, a three-phase recloser having three separate pole units each with its individual operating coil and having a common lockout mechanism activated by one of counters individual to each pole, has two of its poles connected in series with the line conductors of an ungrounded single-phase circuit which it is desired to protect against ground faults. The third pole is connected in circuit with the opposed secondaries of a pair of control transformers having their primaries connected between ground and a different one of the line conductors. Upon the occurrence of a ground on either of the line conductors an unbalance results between the voltages of said secondaries which results in operation of the third pole unit. If the fault continues, the third pole unit opens and recloses until its counter effect lock out of all three pole units.

For a more complete understanding of the nature and scope of our invention, reference may be made to the following detailed description, which may be read in connection with the accompanying drawings in which.

Figure 1:
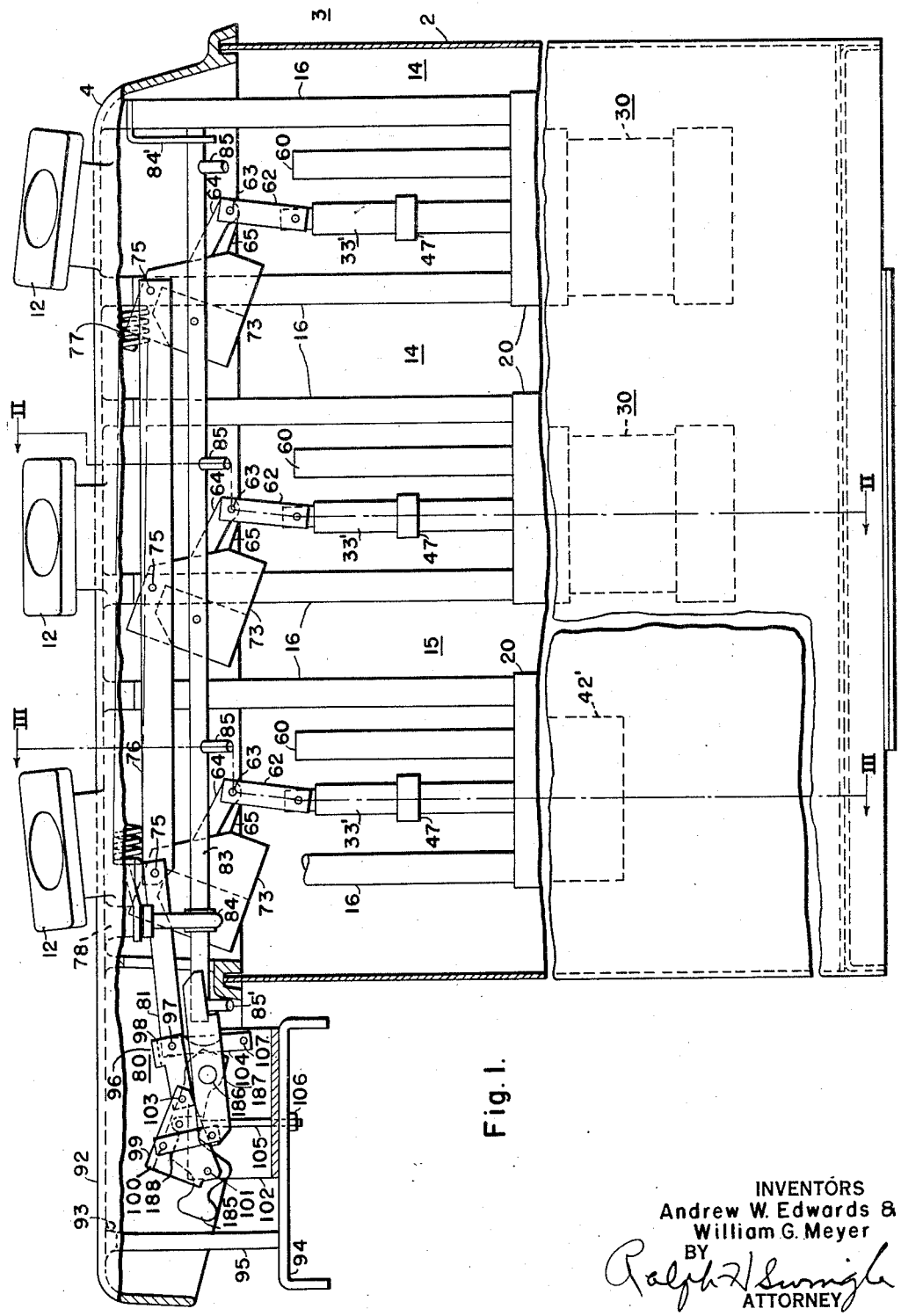
Figure 1 is a side elevation view, partly broken away, and wtih certain parts in section, illustrating a three-pole circuit interrupting device constructed in accordance with one embodiment of this invention.

The circuit interrupting device 3 shown in Fig. 1 is mounted in a metal tank 2 having an open top adapted to be closed by a hollow cover casting 4, which may be secured to the tank in any desired manner, for example as by bolts (not shown) or the like secured to the tank.

The circuit interrupting device illustrated is substantially identical with that of copending application Serial No. 184,482 of Andrew W. Edwards, et al. entitled Circuit Interrupter Operating Mechanism, filed on September 12, 1950, issued May 29, 1956, as Patent No. 2,748,221, and assigned to the assignee of the present invention, and is shown as having three poles, with the cover having three spaced pairs of bushing supports 12 on which lead-in bushings for line conductors may be mounted. Instead of having three identical switch units 14, however, a switch unit 14 is provided for each of two poles while a slightly different switch unit 15 is provided for the other pole.

Figure 2:
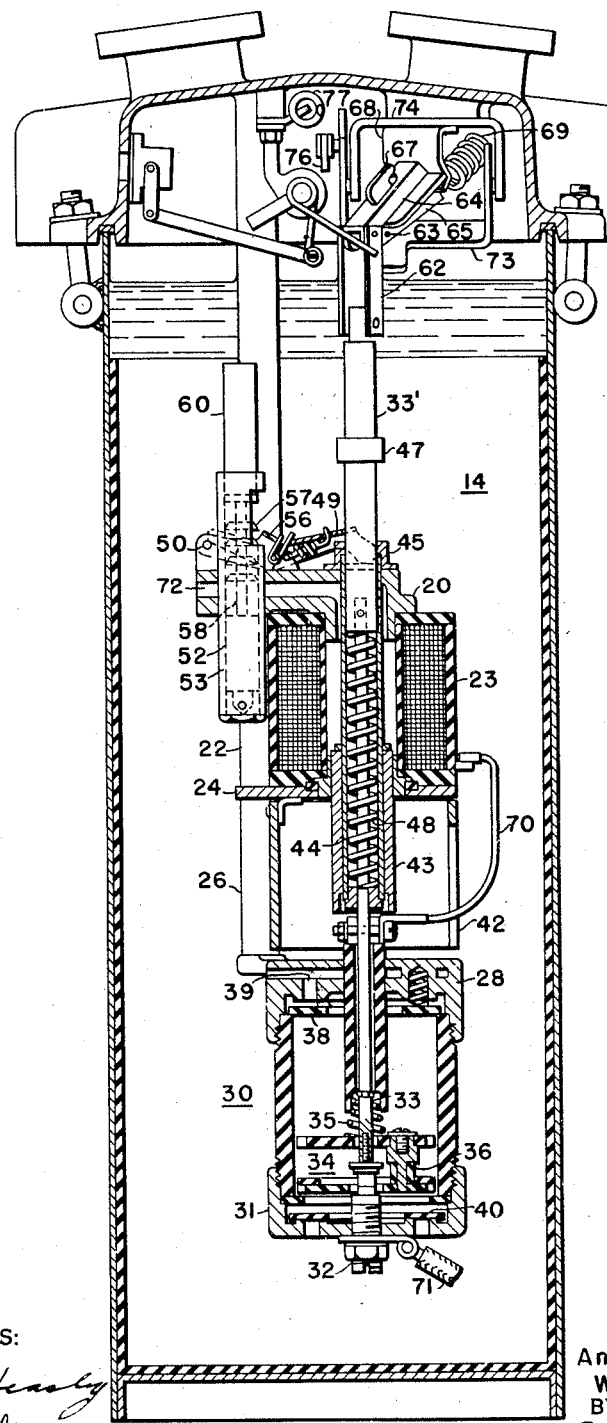
Fig. 2 is a transverse section of the interrupter shown in Fig. 1 illustrating one of the automatic reclosing units, and taken substantially on the line II—II of Fig. 1.

Each of the switching units 14 and 15 is capable of automatically opening and closing the circuit. Each of these automatic reclosing units 14 and 15 is supported from cover 4 by supporting rods 16 which are directly secured to a casting 20 at their lower ends. As shown in Fig. 2, units 14 have additional supporting rods 22 for the purpose of supporting a series operating coil 23 between casting 20 and a supporting plate 24 spaced beneath the casting, and still further supporting rods 26 are for the purpose of suporting at their lower ends the top cap 28 of an arc chamber 30 from supporting plate 24. The supporting rods 16 are preferably of an insulating material, while the rods 22 and 26 may be either metallic or insulating material. Arc chamber 30 includes a tube of insulating material, such as fiber, threaded into top cap 28, and having a bottom cap 31 threaded on the lower end thereof. A stationary contact screw 32 is threaded into a center opening provided in bottom cap 31 of the arc chamber, and it is adapted to be engaged within the chamber by the lower end of a movable contact rod 33 having a liquid directing structure 34 slidably mounted thereon within the arc chamber. Liquid directing structure 34 has lost motion relative to the contact and is biased downwardly by a spring 35 and further includes a check valve ring 36 providing for freer movement of the movable contact rod and liquid directing structure downwardly than in an upward direction, and the arc chamber itself is provided with an outlet valve ring 38 spring biased to normally uncover outlet passage 39 in the top cap 28, and an inlet check valve ring 40 controlling inlet openings in bottom cap 31.

A tubular gas shield 42 of either metal or an insulating material, such as fiber, is supported between top cap 28 of the arc chamber and supporting plate 24 for the bottom of series coil 23, being secured to plate 24, to prevent gases escaping from outlet 39 of the arc chamber from access to the central part of the casing in the vicinity of contact rod 33. A tubular solenoid core 43 is slidably mounted within series coil 23 and telescopically on contact rod 33, with an actuating tube 44 projecting upwardly therefrom to have an actuating bushing 45 secured thereon at the top of casting 20, and being engageable with an integral shoulder 47 provided on the upper part 33' of contact rod 33. A coil compression spring 48 is interposed between solenoid core 43 and a shoulder adjacent the lower end of the upper portion 33' of contact rod 33 to be compressed as the core is attracted upwardly by coil 23.

Switching unit 15 is generally similar to units 14, except that instead of having an enclosed arc chamber 30, an open arc chamber is provided by a cylindrical sleeve 42' of insulating material supported from the lower supporting plate 24. Stationary contacts 32' are secured to the lower edges of sleeve 42', and are adapted to be engaged by a bridging contact 32" secured to the lower end of contact rod 33, which is likewise actuated by a tubular solenoid core 43 slidably mounted on the rod, and having an actuating tube 44 projecting upwardly therefrom to have an actuating bushing 45 secured thereto for engaging an integral shoulder 47. A coil spring 48 is likewise interposed between core 43 and a shoulder adjacent the lower end of upper section 33' of contact rod 33 of switching units 14.

While series operating coils 23 of switch units 14 may be designed to actuate their solenoid cores in response to current values on the order of 200% of the normal line current of a power circuit, which may range from 25 to 100 of more amperes, coil 23' of switching unit 15 is designed to operate at much lower values of current, on the order, for example, of 5 to 20 amperes, in order to provide adequate protection against high resistance ground faults and the like. The contact arrangement of switching unit 15 provides full stroke operation without relying on the energy of the arc and thus facilitates interrupting the relatively small currents at the relatively low voltages found in such instances.

In other respects, units 14 and 15 are similar, and in order to count the number of closely successive interrupting operations of the reclosing units, an actuating lever 49 is pivotally mounted on casting 20 of each unit as at 50, with its outer end resting on actuating bushing 45, for advancing a counting piston 52 mounted in a vertical counting cylinder 53 having a liquid inlet in the bottom thereof controlled by a check valve 54, by means of a pawl portion 56 pivotally disposed on the actuating lever and which is engageable with ratchet teeth 57 formed on a rod 58 which extends upwardly from piston 52. At the upper end of piston rod 58, there is provided an operating rod 60 for a purpose to be described.

The upper portion 33' of contact rod 33 of each operating unit is pivoted to a pair of connecting links 62 which, in turn, are pivoted on a common pivot 63 to adjacent ends of a channel-shaped link 64, and a link 65 which has a hook portion 67 extending through an opening in the channeled link 64. The other end of channeled link 64 is pivoted in pivot depressions formed in the lower end of a pivot supporting bracket 68 secured to a lug integral with tank 4, and the two links 64 and 65 are held at the position shown by a coiled tension spring 69 engaged between a lug integral with tank cover 4 and link 65, to thus not only maintain the links in the position shown in Figs. 2 and 3, but also to exert substantial pressure on the contacts at the closed-circuit position.

In operation, each automatic reclosing unit 14 being structurally substantially identical with the unit disclosed in the copending application of J. M. Wallace et al. Serial No. 162,174, entitled Time Delayed Circuit Breakers, filed May 16, 1950, issued July 28, 1953, as Patent No. 2,647,184 and assigned to the same assignee as this invention, will in general operate in substantially the same manner as the units in such copending application. The unit 15 also operates in a similar manner except for the arc-pressure effect of the closed interrupter which is not used in the unit 15. Accordingly, for a more complete description of the parts of each units and the mode of operation, reference is hereby made to the aforesaid copending application.

In general, operating coils 23 being connected in series in the respective phase conductors by a conductor (not shown) leading to one of the bushings on cover 4, and conductor 70 connecting each coil to its contact rod 33, and thence by a conductor 71 to the other bushing mounted on tank cover 4, each coil will operate to attract its solenoid core 43 on overcurrents in its circuit conductor and after compressing spring 48 during upward movement, the core will eventually cause the bushing 45 at the upper end of tube 44 to engage shoulder 47 on the contact rod to separate the movable contact from stationary contact screw 32, and thus draw an arc in arc chamber 30. The arc thus drawn will be acted on by liquid directed through the arc by the liquid directing structure 34, which is picked up by the movable contact rod in its upward movement. The pressure existing within the arc chamber during arcing operates to seal off the inlet and outlet valves 40 and 38, respectively and also acts to accelerate opening movement of the contact rod.

Likewise, operating coil 23' is connected by a conductor 61 to one bushing (not shown) and by a conductor 59 to one of the stationary contacts 32'. The circuit then extends by a conductor 66 to the other bushing (not shown). When energized by a current of the proper value, which may be on the order of from 5 to 25 amperes, for example, coil 23' causes its core 43 to move upwardly, raising contact rod 33 and bridging contact 32" to interrupt the circuit therethrough.

Upward movement of any actuating sleeve 44 and bushing 45 operates lever 49 and pawl 56 to advance counting piston 52 and rod 60 a predetermined amount. In the case of units 14, as soon as the arc within arc chamber 30 is extinguished, the movable contact rod is free to return due to the force of gravity, and possibly some force due to spring 69, to thus automatically reclose the circuit through each unit. In doing so, the arc chamber 30 may be flushed out by gases escaping through the top cap 28 being replaced by fresh liquid entering the inlet openings in the bottom cap 31. The contact 32" of unit 15 is free to return as soon as the circuit is sufficiently deenergized for core 43 to drop by gravity. In the event of continuing overload, operation of the particular unit continues with counting piston 52 being moved forward a further amount each time, and the counting piston may also control outlet passage 72 in casting 20 for varying the rate of fluid displacement by the armature 43 during its upward movement. Accordingly, initial circuit-opening operations will be substantially unaffected and will occur substantially instantaneously, but when the piston arrives at the passage 72, it will obstruct it to thus slow down subsequent circuit-opening operations occurring in close succession thereafter, due to the dashpot action of core 43. Of course, if the overload is not a continuing one, counting piston 52 will slowly reset by the displacement of liquid trapped beneath the same when it was advanced through the small clearance between the piston 52 and cylinder 53, so that if a continuing overload appears on the circuit at a later time, it will again operate to count only closely successive circuit-opening operations.

In the automatic circuit opening and closing operations such as described above, each unit is operable independently of the other, so that if the overload occurs on only one phase, or in the circuit of unit 15 only the unit located in that phase conductor or circuit will operate, with the other units remaining closed.

Figure 3:
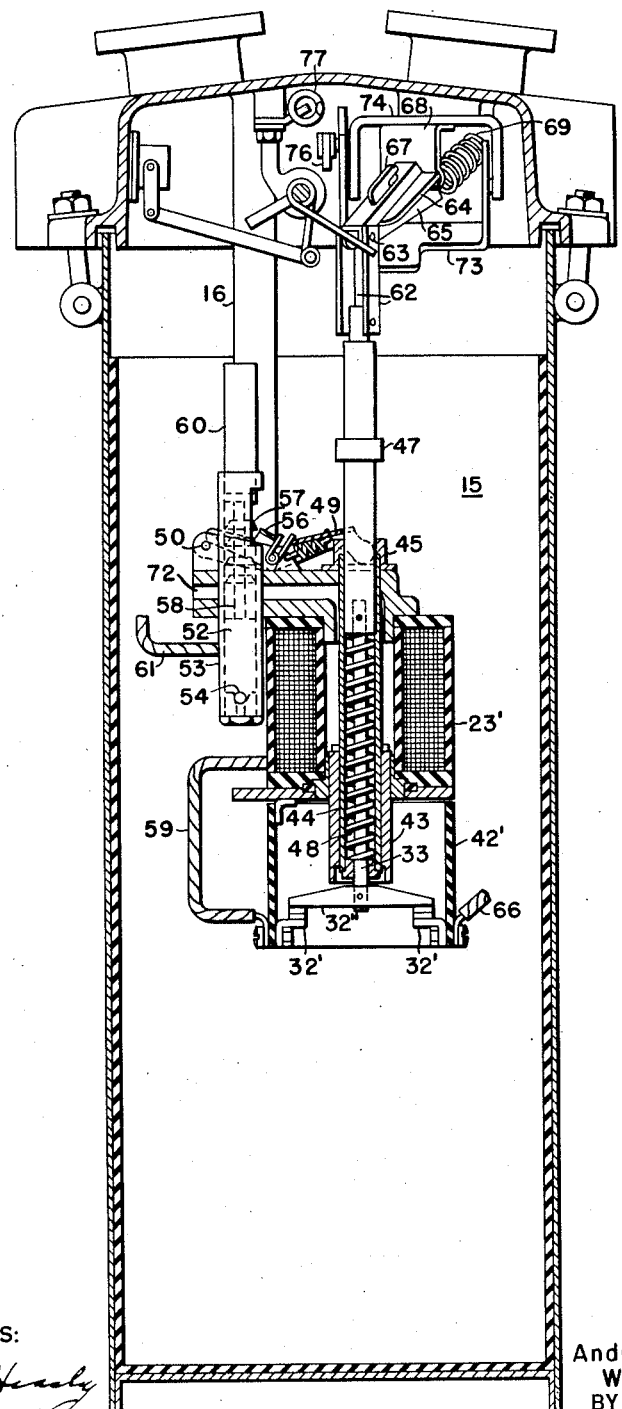
Fig. 3 is a transverse section of another one of the interrupters shown in Fig. 1 taken substantially on the line III—III of Fig. 1.

As shown generally in Figs. 1, 2 and 3, a generally U-shaped bracket 73 has its leg portions pivotally mounted on the leg portions of an inverted U-shaped supporting bracket 74 having the bight portion of the latter secured to an integral supporting lug in cover 4 for tank 2, there being such brackets for each of the automatic reclosing units 14 and 15 with the bight portion of each bracket 73 positioned beneath links 64 and 65 connected to the upper end 33' of the contact rod 33 of the respective units. One leg of each bracket 73 has pivotally connected therewith as at 75, a connecting rod 76 which is common to all of the units, having the bracket 73 of each unit pivotally connected thereto. Connecting rod 76 is biased to the left as viewed in Fig. 1 in a direction to rotate brackets 73 counterclockwise to bring their bight portions into engagement with their respective links 65 to raise the contact rods 33 and hold them at an open-circuit position, by a coil tension spring 77, having one end secured to a lug 78 integral with cover 4, and having the other end secured to an angled end of connecting rod 76. However, connecting rod 76 is normally locked against movement by an operating mechanism 80, since the inner end of the connecting rod is pivotally connected to a toggle link 81 thereof as at the pivot point 75.

The hollow cover 4 for tank 2 has an integral extension 92 at one end which extends outwardly beyond that end of the tank and has therein integral supporting lugs 93 for supporting a plate 94 at a position spaced beneath the cover, as by one or more supporting rods 95, for the supporting operating mechanism for the circuit interrupting device.

Figure 4:
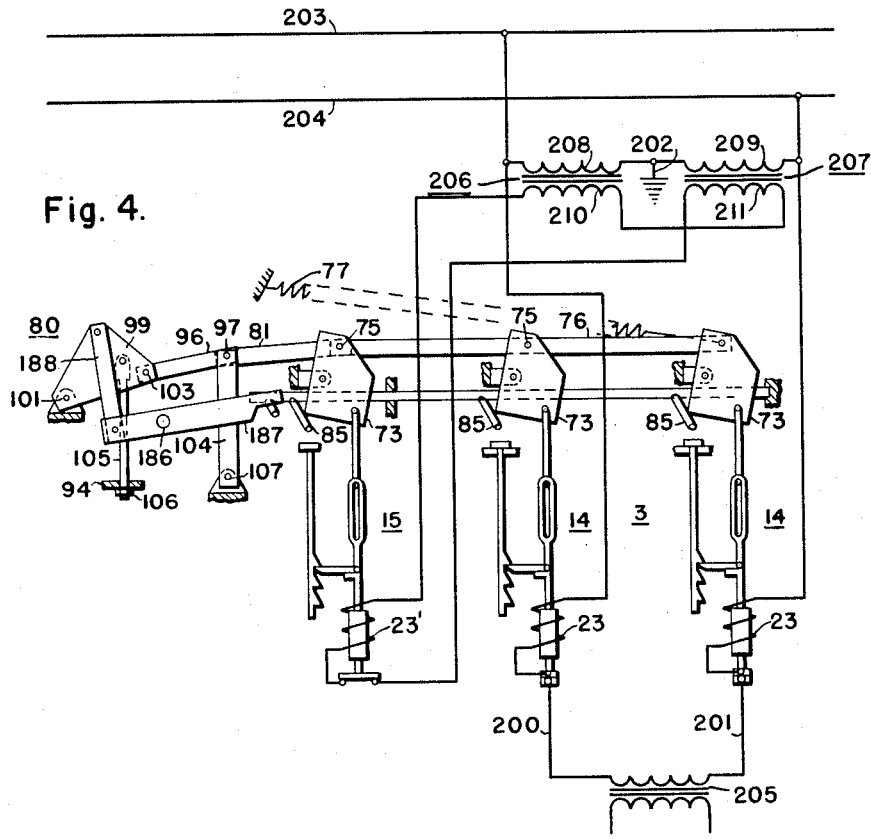
Fig. 4 is a diagrammatic view of polyphase recloser similar to that of Figs. 1 through 3 connected to provide ground fault protection for a single-phase ungrounded circuit and embodying the principal features of the invention.

The operating mechanism as shown principally in Figs. 1 and 4 includes a toggle linkage mounted on top of supporting plate 94, comprising the toggle link 81 which is connected to the adjacent pivot 75 for the adjacent switch unit 15 at one end, and at its other end is connected to a second toggle link 96 which is of inverted U-shape at the end adjacent link 81, to form one overcenter pivot 97. Toggle link 96 has a bight portion 98 overlying the adjacent end of link 81 to limit relative movement of overcenter pivot 97 downwardly. A third toggle lever 99 also of U-shape has the legs thereof adjacent bight portion 100 mounted on a stationary pivot 101 on a stationary supporting bracket 102 also of substantial U-shape with its bight portion secured to the upper side of mechanism supporting plate 94. Toggle lever 99 is connected to link 96 by an overcenter pivot 103, so that the toggle linkage includes the two overcenter pivots 97 and 103.

Overcenter pivot 97 of the toggle linkage is adapted to be held against movement at the closed-circuit position of the interrupting device by means of a link 104 pivoted on the same axis as overcenter pivot 97 at one end, and at its other end, is stationarily pivoted at 107 between the legs of bracket 102. It will be observed that at the closed circuit position of the parts illustrated in Figs. 1 and 4 overcenter pivot 97 is slightly above the center line between toggle pivots 103 and 75 so that spring 77 tends to break this toggle upwardly but this is prevented by link 104. Similarly a link 105 connected to lever 99 extends through plate 94 and has a stop nut 106 thereon which prevents toggle levers 99 and 96 from breaking upwardly.

Common to the units 14 and 15 is a rotatable trip shaft 83 which extends in proximity to the upper ends of all units, being supported from cover 4 by brackets 84 and 84'. Trip shaft 83 is provided with a plurality of radially extending cranks 85 and 85' there being a crank 85 for each unit and an additional crank 85' located adjacent the operating mechanism 80. A handle 185 may be provided under the extension 92 mounted on a shaft 186 which has thereon a lever 187 having an end overlying crank 85' and another end connected to toggle lever 99 by a link 188 for setting and breaking the toggle arrangement of levers 99 and 96.

Assuming the parts of the operating mechanism and circuit interrupting device to be at the closed-circuit position illustrated, it will be apparent that by pulling downwardly on handle 188, the operating shaft 186 will be rotated in a direction such that its operating link 187 causes toggle link 99 to move downwardly thus moving overcenter pivot 103 downwardly and over its center to the position where the toggle linkage is broken and at which position the circuit interrupting device is held at open circuit position by spring 77 mounted in cover 4. At this time, handle 188 will project beneath cover hood 92, and it will be apparent that by moving this back up to the position shown in Fig. 1, toggle link 99 will be moved back upwardly to move overcenter pivot 103 upwardly overcenter to the position shown in Figs. 2 and 4 where it is held by engagement of stop 106 of link 105 with plate 94, with the contacts of the circuit interrupting device thus being held at their closed-circuit position.

As previously described, the counting piston 52 of each automatic reclosing unit 14 and 15 may, on sustained overload in that particular phase or circuit, be advanced upwardly, until after a predetermined number of closely successive operations the operating extension 60 thereof engages the radial crank 85 on trip shaft 83 located immediately thereabove, to rotate the trip shaft and thus cause the inner radial crank 85' to rotate lever 187 and operating shaft 186 in a direction to move toggle lever 99 downwardly, and overcenter pivot 103 downwardly overcenter, to thus release tension spring 77 to move connecting rod 75 to the left. Such movement of connecting rod 75 carries with it each of the brackets 73, causing each bracket to lift the movable contact rod of its unit 14 and 15, and thus open the contacts of all of the units and hold them open. Also the contacts of all units 14 and 15 may be manually opened and closed by movement of handle 188 in opposite directions, as previously described, because this will move overcenter pivot 103 of the linkage overcenter in opposite directions to either release spring 77, or prevent operation thereof. Furthermore, when the contacts of all units 14 have been opened by either manual, or automatic operation, they may be closed manually.

In order to provide protection against ground faults of an ungrounded circuit the recloser 3 may be connected as shown in Fig. 4, with switches 14 in series with each of the conductors 200 and 201 connecting an ungrounded distribution circuit comprising conductors 203 and 204 to a high voltage source through transformer 205. Control transformers 206 and 207 may be connected with their primaries 208 and 209 between the conductors 203, 204 and ground being, grounded by conductor 202. The secondaries 210 and 211 may be connected in opposition to the operating coil 23 of switch 15 for operating its core 43 whenever a ground on one of the conductors 203, 204 causes an unbalance between the voltages thereof.

With the apparatus as shown in Fig. 4, an overcurrent on the distribution circuit will cause operation of switches 14 in the usual manner, which will interrupt the circuit and if the overcurrent continues, will cause advancement of counter extension 60 to actuate cranks 85 and rotate trip shaft 83. This effects movement of lever 187 to break the toggle relation of levers 99 and 96, permitting spring 77 to activate lockout bar 75. This rotates levers 73 coutnerclockwise, and raises toggle levers 64 and 65, locking switches 14 and 15 open. Reclosing is effected by operating handle 185 to return toggle levers 96 and 99 to the position shown.

Should a ground occur on one of the conductors 203, 204, the resulting current may be insufficient to operate the units 14 directly, but there will be an unbalance between the voltages thereof. A differential voltage will appear across the secondaries 210, 211, which is applied to operating coil 23' of switch 15. Switch 15 operates and if the ground continues, it opens and recloses, advancing counter extension 60 until after a predetermined number of such openings, usually three, it actuates trip crank 85. This operates the mechanism 80 to activate lockout bar 76 and lock out switches open, even though the current in the conductors 203, 204 may not be sufficient to itself cause operation of switches 14.

Figure 5:
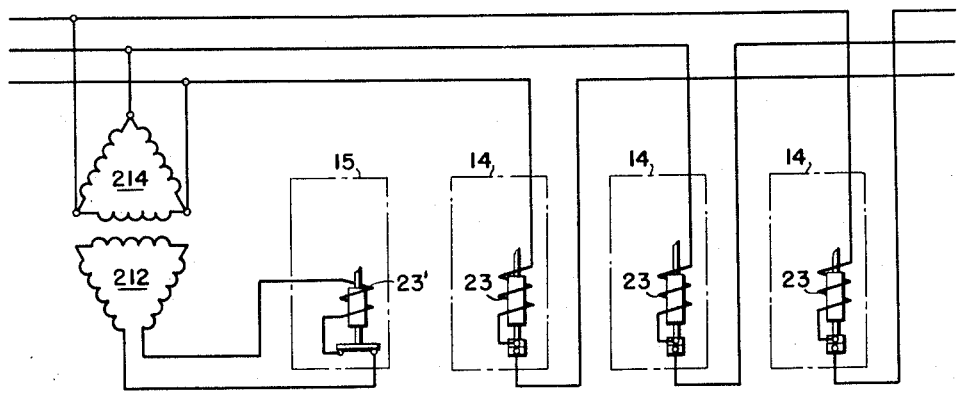
Fig. 5 is a diagrammatic view of a similar recloser adapted to protect a three-phase ungrounded circuit.

It will be apparent that in applying our invention to a three-phase ungrounded circuit as shown in Fig. 5, three pole units 14 will be used, one coil 23 being connected in series with each phase, together with a fourth pole unit 15 having its coil 23′ connected in series with the delta connected secondaries 212 of three potential transformers having their primaries 214 connected in delta to the three phase circuit.

From the above description and the accompanying drawings it will be clear that we have provided in a simple and effective manner for protecting ungrounded systems against ground faults. We use substantially standard apparatus which is readily modified by changing one of the units thereof in line with our teachings. Thus no special equipment is needed, and hence it is relatively inexpensive. Because both ground fault and overcurrent protection are provided in the one recloser, the counter and lockout arrangement of the recloser provides a reliable and effective means of protection.

Since certain changes may be made in the above description and the accompanying drawings without departing from the spirit or scope of the invention, it is intended that all the matter contained in the above description and shown in the accompanying drawings shall be considered as descriptive, and not in a limiting sense.

We claim as our invention:

1. In a protective system for a distribution circuit, electrical apparatus comprising, a plurality of pole units each with separable contacts, electroresponsive means individual to the contacts of each unit for separating them, lockout means common to all of the units for locking the contacts open, a counter individual to each unit for operating the lockout means, and a differential ground circuit connected across a plurality of the pole units and connecting the electroresponsive means of one unit to operate in response to a ground fault current for opening the other units.

2. Circuit interrupting apparatus for protecting an ungrounded circuit comprising; a plurality of pairs of separable contacts; electroresponsive means individual to each pair of contacts for effecting separation thereof, the electroresponsive means for two of said pairs having a rating in excess of twenty-five amperes for connection directly in circuit with the line conductors of the ungrounded circuit, and the electroresponsive means for the other pair having a rating on the order of less than twenty-five amperes; lockout means common to all of said pairs of contacts for locking them open; counting means individual to each pair for rendering the lockout means operative in response to a predetermined number of separations of its pair of contacts, and circuit means including a pair of potential transformers connecting the electroresponsive means of the other pair of contacts in a normally balanced voltage-divider circuit between the line conductors and ground for effecting operation of said other electroresponsive means in response to an unbalance between the voltages of said conductors and ground.

3. In combination, a transformer connected to supply electrical energy to a normally ungrounded circuit, a three-phase recloser having three pairs of separable contacts with two of said pairs connected in circuit between the transformer and said circuit, electroresponsive means individual to said two pairs of contacts connected in series with the contacts for opening them in response to currents in excess of twice the normal line current, electroresponsive means individual to the third pair of contacts for opening them in response to a current much less than the line current, normally ineffective lockout means biased to separate all of said pairs of contacts, counting means individual to each pair of contacts for rendering the lockout means effective in response to a predetermined number of operations of any one of said electroresponsive means, and circuit means including a grounded voltage-divider circuit connected to the circuit to apply a differential voltage to the electroresponsive means of the third pair of contacts in response to a ground on one of the circuit conductors.

4. A ground fault detection system for an ungrounded single phase distribution circuit comprising, a recloser having separable contacts for connection in circuit with each of the line conductors of the circuit, operating mechanisms therefor having electroresponsive means for actuating said mechanisms and separating said contacts including an operating winding connected in series with the respective conductor, and an additional pair of separable contacts with electroresponsive means for actuating the mechanism thereof for separating them in response to current much less than that of the line conductors, said recloser having a common lockout member biased to actuate said mechanisms to open all of said contacts, and counting means individual to each pair of contacts for releasing the lockout means in response to a predetermined number of separations of the respective contacts; and means including a pair of transformers having primary windings connected between the conductors and ground and secondary windings connected to energize the electroresponsive means of the additional pair of contacts in opposed senses.

References Cited in the file of this patent

UNITED STATES PATENTS

| | | |
|---|---|---|
| 2,530,298 | Harper | Nov. 14, 1950 |
| 2,567,411 | Van Ryan | Sept. 11, 1951 |
| 2,666,824 | Dorfman | Jan. 19, 1954 |
| 2,666,825 | Wallace | Jan. 19, 1954 |
| 2,692,313 | Wallace et al. | Oct. 19, 1954 |
| 2,757,321 | Wallace | July 31, 1956 |

FOREIGN PATENTS

| | | |
|---|---|---|
| 548,294 | Germany | Apr. 9, 1932 |